United States Patent [19]

Lock et al.

[11] Patent Number: 4,904,146
[45] Date of Patent: Feb. 27, 1990

[54] WHEEL RETAINER BLADE FOR WHEEL LIFT APPARATUS

[75] Inventors: Walter G. Lock, Signal Mountain, Tenn.; Vernon S. Moore, Ringgold, Ga.

[73] Assignee: Holmes International Inc., Chattanooga, Tenn.

[21] Appl. No.: 194,855

[22] Filed: May 17, 1988

[51] Int. Cl.$^4$ ............................................. B60P 3/06
[52] U.S. Cl. .................................. 414/563; 414/430; 280/402
[58] Field of Search ............... 414/563, 426, 430, 546, 414/537, 538, 463, 464, 465, 466; 280/402; 294/904, 81.5

[56] References Cited

U.S. PATENT DOCUMENTS

| | | | |
|---|---|---|---|
| 2,552,804 | 5/1951 | Morris | 414/430 |
| 2,573,728 | 11/1951 | Pugh, Sr. | 414/430 |
| 2,776,063 | 1/1957 | Larson | 414/430 |
| 3,822,798 | 7/1974 | Neff | 414/537 |
| 4,121,788 | 10/1978 | McMahon | 414/430 X |
| 4,637,623 | 1/1987 | Bubik | 414/563 X |
| 4,741,661 | 5/1968 | Carey | 414/563 |

FOREIGN PATENT DOCUMENTS 1407262  9/1975  United Kingdom ................ 280/402

Primary Examiner—Robert J. Spar
Assistant Examiner—Robert S. Katz
Attorney, Agent, or Firm—Alan Ruderman

[57] ABSTRACT

Apparatus for wheel lift towing vehicles for supporting the tires of a vehicle to be lifted and towed. The apparatus includes a pair of tire support cradles having front and rear members for respectively engaging the front and rear surfaces of a tire of the vehicle to be towed. The rear member has a bar which mounts a moveable support member in the form of a foldable plate. The plate may be raised above the bar to provide a retaining surface for engaging and supporting the rear surface portion of the tire, and may be lowered to provide clearance for entry beneath the vehicle and behind the tire. The plate in its lowered position is also adapted to be positioned on the ground so as to provide a ramp over which the tire may be drawn into the cradle when, for example, the tire is flat.

20 Claims, 1 Drawing Sheet

WHEEL RETAINER BLADE FOR WHEEL LIFT APPARATUS

BACKGROUND OF THE INVENTION

This invention relates to towing vehicles and more particularly to a wheel retainer blade for the vehicle support member of wheel lift apparatus for supporting the rear portion of the wheels or tires of a vehicle to be lifted or towed.

Because of the large amount of plastic material used on the front and rear portions and bumpers of recent model automobiles, developments in the art of lifting and towing disabled vehicles by a towing vehicle have been directed toward what is known in the art as "wheel lift" devices, which engage and lift the front or rear tires of a disabled vehicle. Examples of towing apparatus incorporating such devices are illustrated in Wagner U. S. Pat. No. 3,182,829; Bubik U.S. Pat. No. 3,897,879; Cannon Jr. et al U. S. Pat. No. 4,451,193; Brown U.S. Pat. No. 4,473,334; Porter Sr. et al U.S. Pat. No. 4,573,857; Hamman U.S. Pat. No. 4,634,337; Bubik U.S. Pat. No. 4,637,623 and Holmes et. al U.S. Pat. No. 4,679,978. As disclosed in each of these patents the tires of a disabled vehicle are disposed within the well of some form of cradle, the cradle having members which engage and support the front and rear of the tires carried therein.

The wheel supporting cradles generally have a fork of a substantially U-shaped configuration in plan, the legs of the cradle opening either inwardly, outwardly or rearwardly. In the latter instance the open position is closed by a retaining member subsequent to the tire being disposed within the well, the retaining member engaging the rear of the tire. In the former cases, the rear of the tire is engaged by an arm, commonly known in the art as an "L" arm since it has that configuration, and such arm may have an upstanding arcuate contour conforming somewhat to the shape of the tire so as to provide greater support by the larger surface contact with the tire. Examples of the former "L" arm configurations are illustrated in at least the aforesaid Porter et al and Holmes patent, while examples of the latter "L" arm configurations are illustrated in at least Wagner and the Bubik '623 patents.

The front of the tire generally merely rests on a ramp either formed on the front leg of the U-shaped cradle, as in Cannon et al and Porter et al, or formed on the rear of a laterally extending cross arm or tow bar which carries the "L" arms at its extremities, such as in Bubik '623 and Holmes. In Wagner, both the front and rear support for the tires is provided by spaced apart arcuate shaped plates or feet which are connected together by chains so that both the front and rear of the tire is engaged by the greater surface contact provided by these contoured feet. However, in Wagner the feet on both sides of the vehicle are carried by a respective arm depending downwardly from a frame supported above the vehicle to be towed, and the entire wheel lift apparatus is difficult to utilize effectively. This is one reason the art has developed in the direction of engaging the tires with a wheel lift device which enters from beneath the disabled vehicle.

When a disabled vehicle is being towed, it is highly desirable that the tires rest securely within the cradle so that the momentum of the disabled vehicle does not result in the tires rolling and disengaging from the cradle when the towing vehicle accelerates or stops. On acceleration, the disabled vehicle and the tires tend to surge rearwardly, but upon stopping of the towing vehicle, the disabled vehicle and the tires tend to surge forwardly. Accordingly, it is highly desirable to have enlarged wheel engaging feet at the front and rear of the cradle.

One of the problems presented when engaging the tires from beneath the vehicle is that modern automobiles have a low configuration, that is, they are built low to the ground and the bodies thereof have low ground clearance and small clearance between the tire wells and the tires. Thus, if the cradle has enlarged feet, the low clearance prevents the feet from entering beneath the automobile from, for example, the front of the vehicle. If a large foot is desirable to support the front of the tire of the disabled vehicle, then the prior art, as exemplified by the aforesaid Porter et al patent, has not utilized a foot at the rear of the tire but has provided means for rotating the rear support of the cradle outwardly from beneath the vehicle. However, even here if the disabled vehicle has a very low ground clearance at the front, the upstanding foot will not slip beneath the body of the vehicle into the tire engaging position. If a large foot is desired to support the rear of the disabled tire, the foot may be rotated inwardly from the outboard side of the vehicle, as exemplified by the Bubik '623 patent. However, as illustrated in that patent, the front support is merely a ramp on the cross bar or the like since a large foot for supporting the front of the tire will not enter beneath the low ground clearance front end of late model vehicles.

In copending U.S. patent application Ser. No. 07/183,044 filed on Apr. 19, 1988, by Walter G. Lock, one of the coinventors herein and assigned to Holmes International Inc., the same assignee of the present application, there is disclosed a pivotably foldable ramp juxtaposed adjacent to the fixed ramp at the front of the cradle, the foldable ramp providing an extension of the fixed ramp, and thus an enlarged foot at the front, when in an operative position, yet may be pivotably folded to an inoperative position which permits the support member on which it is mounted to enter beneath low ground clearance vehicles without presenting an obstacle thereto.

However, as aforesaid, it also desirable to have an enlarged foot for supporting the rear surface of the wheel or tire of the vehicle to be towed. Although the Bubik '623 patent does disclose an enlarged upstanding foot or blade, it requires that the arm to which the foot is attached be rotated a substantial amount for the foot to be received behind the rear of the tire, and it must then be lifted in order to adjust the arm longitudinally to engage the rear surface of the tire with the blade. When positioning the support arm it is more natural to merely slide the arm forwardly to engage the blade against the rear surface of the wheel. However, with the small wheel well clearances of recent automobiles this cannot be accomplished with the prior art blades such as that illustrated in Bubik '623 since the blade provides an obstacle for substantial movement of the arm so that it must be rotated to position the blade to closely adjacent the rear surface of the wheel. Additionally, apparatus such as disclosed in Bubik '623 may not be used when the tire of the vehicle to be towed is immediately adjacent to a curb or the like unless the vehicle has a high wheel well clearance or else the top of the blade when rotated from the higher level of the curb will engage the body of the vehicle. Furthermore, when a disabled vehicle, such as one involved in an accident, has flats in one or more of the tires which are to be lifted, the vehicle must first be winched to dispose the tires properly for lifting by the cradles. In such instances, because of the flats, the tires are spread wide at the bottom so that if the arm of the cradle were adjusted to its full extent, either the crotch of the cradle would still be too small to straddle and grip the tire, or even if the cradle could straddle and grip the tire while on the ground, once the towing bar is lifted, the tire would slip through the cradle between the front and rear supports. Thus, it is current practice in the art to use the tow bar itself to lift the vehicle off the ground and then place blocks beneath the tires. Thereafter the "L" arms are adjusted to the required size of the tire which is then positioned and supported by the cradle. The tow bar is then lifted further and the blocks are removed. Not only is this time consuming, but it can also cause damage to the vehicle and be unsafe.

SUMMARY OF THE INVENTION

Consequently, it is a primary object of the present invention to provide a cradle for wheel lift towing vehicles for supporting a tire of a disabled vehicle or the like for towing, the cradle having an elongated arm carried by a support beam, the arm having a leg spaced from the support beam for disposition behind the tire of a vehicle to be towed, and a tire engaging member mounted on the arm and moveable relative to the arm from a raised position for supporting the rear of the tire to a reclined position permitting it to enter behind the tire and beneath a low ground clearance vehicle to be towed.

It is another object of the present invention to provide for a wheel lift towing device, a tire supporting cradle carried by a transverse support beam, the cradle having an elongated arm adjustably carried by the beam and including a leg spaced from the beam for disposition behind the tire of a vehicle to be towed while the beam is disposed in front of the tire, the leg having a tire engaging plate moveable relative to the leg between an upstanding operative position and a reclined position permitting the plate to function as a ramp for the tire when winching the vehicle to position the tire and the cradle, and permitting the plate to enter behind the tire of low ground clearance vehicles including those closely adjacent a raised curb.

It is a further object of the present invention to provide apparatus for use in lifting and towing a vehicle, the apparatus including a support cradle carried by a transversely extending support beam, the cradle having means for engaging and supporting a rear surface of the tire of the vehicle, said means including an elongated arm adjustably carried by the beam and a transverse leg adapted to be disposed behind the tire while the beam is disposed in front of the tire, the leg having a moveable plate mounted thereon for movement from at least one upright position for engaging a portion of the rear surface of the tire, one upright position being an operative position supporting the rear of the tire and for folding down to a reclined position for entering beneath the body of the vehicle to be towed behind the tire of a low ground clearance vehicle for subsequent use for engaging the tire, and when necessary may act as a ramp over which the tire may drawn into position in the cradle between the support beam and the leg.

Accordingly, the present invention provides apparatus for wheel lift towing vehicles for supporting the tires of a vehicle to be lifted and towed thereby, the apparatus including a tire support cradle having front and rear members for respectively engaging the front and rear surfaces of a tire of the vehicle to be towed. The rear member includes a bar having a moveable support member in the form of a foldable plate which may be raised above the bar to provide a retaining surface for engaging and supporting a rear surface portion of the tire, and may be lowered to provide clearance for the entry beneath the vehicle and behind the tire, the plate in its lower position being adapted to be positioned on the ground for providing a ramp over which the tire may be drawn into the cradle when necessary.

When the plate is folded to the lowered position the bar is permitted to enter behind the tire beneath a low ground clearance vehicle to be towed without interference of the rear member therewith. Once under the vehicle and adjacent the rear surface of the tire it may be raised to the operative position. Additionally, when the tire is closely adjacent a curb or the like the plate in its lowered position may be located behind the tire. Preferably, the plate is mounted on the bar by means of a sliding hinge means which permits the plate to move between the operative position where a portion of the plate abuts the bar and is prevented thereby from inadvertently moving to the lowered position, and yet permits the plate to be selectively lowered without interference with the bar. In the preferred embodiment, the sliding hinge means comprises a rod received within at least one slotted member fastened to the plate, the rod being carried by the bar on the rear surface thereof. The bar is secured to an elongated arm which is telescopically adjustably carried by a support beam which also carries the front member of the cradle. The arm together with the bar and the foldable plate may be removed from the support beam when not in use for storage within the bed of the towing vehicle, and if desired in certain instances it may be removed and positioned with the bar behind the tire and thereafter attached to the support beam.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
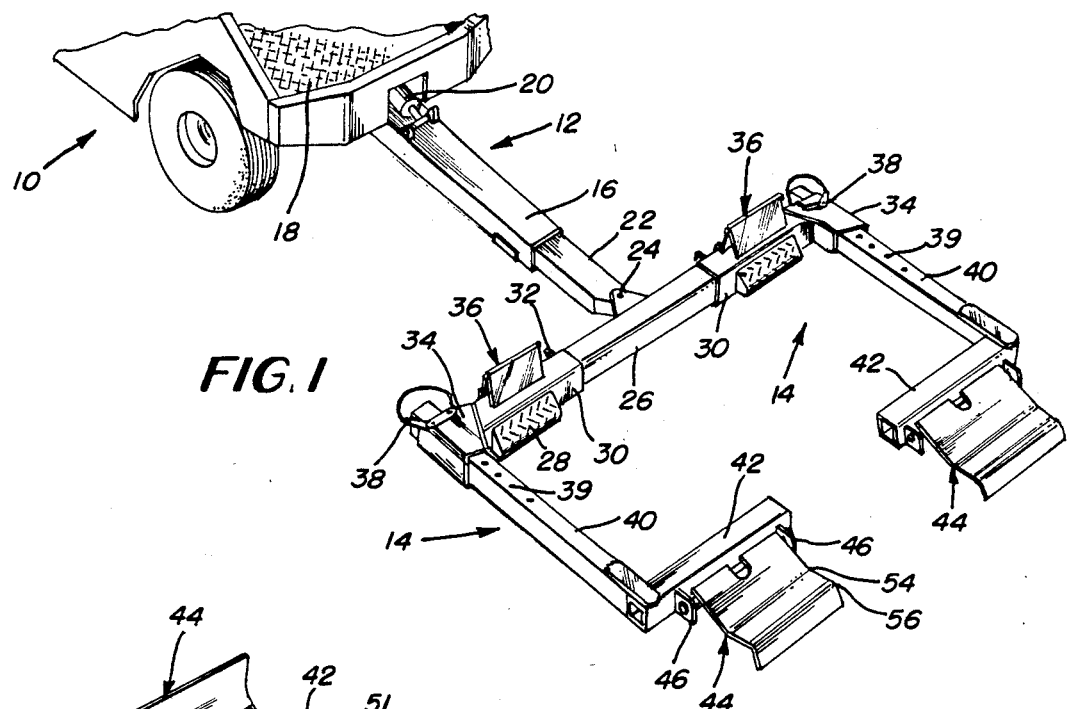
FIG. 1 is a rear perspective view of a portion of a towing vehicle looking forwardly having wheel lift apparatus illustrated as partly extended and incorporating wheel engaging cradles constructed in accordance with the principles of the present invention.

Referring to the drawings, a towing vehicle 10 is illustrated having wheel lifting apparatus 12 incorporating wheel supporting cradles 14 constructed in accordance with the principles of the present invention. The wheel lifting apparatus 12 includes a hollow boom housing 16 which may be extended by extension means disposed within the bed 18 of the towing vehicle, and may be tilted by tilting means including a tilt cylinder 20 as fully disclosed in the aforesaid Hamman U.S. Pat. No. 4,634,337 assigned to the common assignee of the present invention. Telescopically disposed within the lifting boom housing 16 is at least one inner or lifting boom 22 which may be extended and retracted relative to the lifting boom housing 16 in conventional manner.

Mounted at the free end of the inner boom 22 by means of a journal pin 24 is a tow bar or cross beam 26 which may pivot relative to the inner boom 22 about the journal pin 24. At each end of the transversely extending tow bar is one of the wheel supporting cradles 14.

The wheel lift cradles 14 may be formed as separate attachments telescopically received on the ends of the tow bar 26, or each cradle may have elements formed integral with the tow bar. In either instance each cradle preferably includes a fixed front support ramp 28 secured to a support member, the support members preferably are hollow housings 30 conforming in shape to the tow bar and telescopically received on the opposed ends of the tow bar and locked thereon in transversely selected positions by spring biased pins 32 or the like. Each cradle includes a fixed receptacle 34 at the outer end of the support member 30 at the outboard side of the ramp 28, the receptacle comprising a hollow body having a rectangular passageway tapering in the horizontal plane from an enlarged end facing the towing vehicle toward a smaller end facing the vehicle to be towed, but having a substantially fixed height in the vertical plane. Preferably a foldable extension ramp 36 as described in the aforesaid copending U.S. application Ser. No. 07/183,044 is mounted above the fixed ramp 28.

Figure 2:
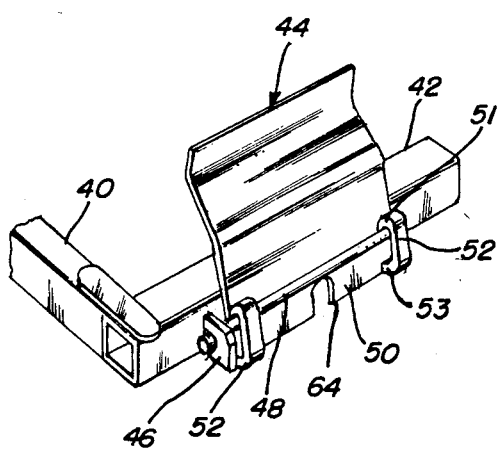
FIG. 2 is a fragmentary rear perspective view looking forwardly of the rear surface engaging portion of the cradle constructed in accordance with the principles of the present invention.

A rear wheel support member, i.e., a member for supporting the rear surface of the tire to be carried in the cradle includes an elongated arm 40 having a rectangular configuration which is telescopically positioned within the receptacle 34, and locked therein by means of a pin 38 received within a selected on of a plurality of bores 39. Conventionally, the arm 40 at its rearwardly extending end carries an angularly inclined blade member having a substantially concave scoop configuration for engaging a rear lower surface portion of the tire of the vehicle to be towed, the blade being fixedly secured to the arm 40. However, in accordance with the present invention the arm 40 has a fixed leg in the form of a bar 42 extending substantially normal thereto and spaced from the ramp 28 so that the bar 42 may be disposed behind a tire when the ramp is disposed in the front thereof, and the leg or bar 42 carries a plate 44 mounted for movement about an axis substantially parallel to the bar 42. As illustrated, each bar 42 has a pair of lugs 46 fastened to the rear surface thereof for carrying a rod 48 having an axis of elongation substantially parallel to the bar 42 and preferably normal to the longitudinal axis of the arm 40. The plate 44 on one surface thereof, that surface 50 being the rearward facing surface when the plate is in the upstanding operative position illustrated in FIG. 2, includes at least one and preferably two brackets 52, the brackets having a substantially U-shaped configuration with its spaced legs 51, 53 secured as by welding to the surface 50 of the plate 44. The rod 48 is received within the slot defined by the space between the surface 50 of the plate 44 and the respective U-shaped bracket 52, and thereby mounts the plate 44 for movement about the substantially horizontal axis of the rod 48 relative to the bar 42 and the leg 40.

The plate 44 may be positioned in at least one upstanding disposition by lifting the plate so that the slot of the U-shaped bracket 52 is disposed substantially vertical and the leg 51 is disposed on the rod 48. The plate may also be positioned in a rearwardly extending lowered disposition with the rod 48 disposed intermediate the legs 51, 53 of the bracket 52 in abutment with a portion of the surface 50. The plate 44 preferably has a slightly bowed concave configuration at its forwardly facing surface 54, i.e., the surface of the plate facing the support bar 26 when the plate is in its upstanding position and the upper surface when the plate is in the reclined position illustrated in FIG. 3, and includes a hump or bend 56 proximately adjacent the end 58 remote from the brackets 52, the bend 56 being such that the end 58 is angled toward the rear, i.e., in the direction away from the support beam 26 when the plate is disposed in its upstanding operative position. As best illustrated by the solid line or operative position of the plate in FIG. 3, the hump 56 may abut a rear surface of the tire 60 of a vehicle to be towed when the tire is disposed in the crotch of the cradle between the front support provided by the fixed ramp 28 and the moveable ramp 36 forming the subject matter of the aforesaid patent application, and the rear support provided by the plate 44 and, depending on the tire size and the deflation thereof, sometimes also the bar 42. When in this position, the end 62 of the plate adjacent the brackets 52 abuts the rear surface of the bar 42 which thus acts as a stop so that the plate 44 will not be inadvertently lowered.

Figure 3:
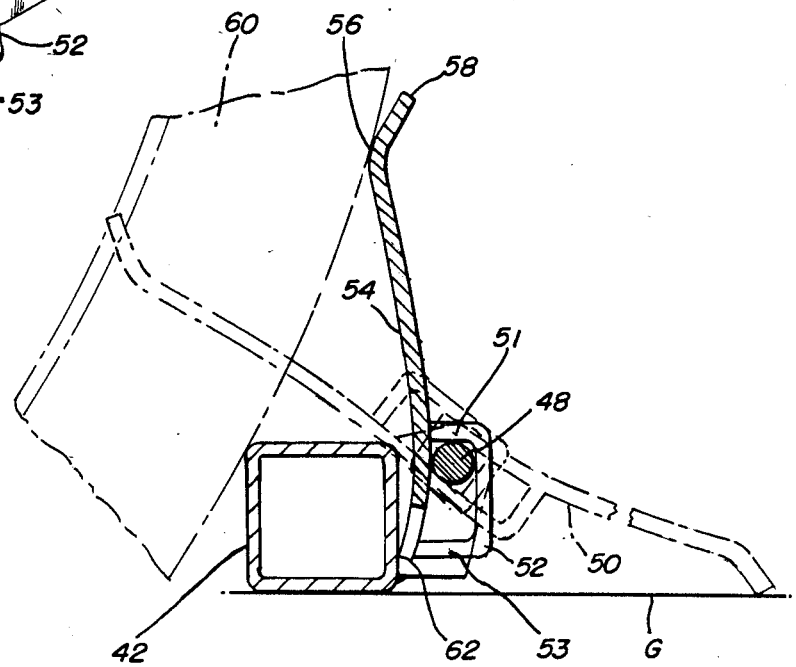
FIG. 3 is a cross sectional view illustrating the moveable plate of the rear surface engaging portion of the cradle, the plate being illustrated in three different positions.

The arrangement of the bracket 52 with the elongated slots formed thereby acts as a sliding hinge means and when the plate is to be lowered to the position illustrated in phantom at the right side of FIG. 3, the plate is first lifted relative to the rod 48 to a position where the end 62 is free from interference with the bar 42 and the plate is then turned clockwise as viewed in FIG. 3. In that position the plate may engage the ground G as illustrated, and may act as a ramp for the respective tire if a disabled vehicle has to be winched into the crotch of the cradle 14, the tire being drawn over the ramp and over the bar 42. This, as aforesaid, is particularly useful when the tires of the disabled vehicle are flat since the arm 40 need only be adjusted to position the bar 42 relative to the beam 26 for supporting the tire and the tire is then winched into the crotch. Also, with the plate in this lowered position, the bar 42 may be positioned behind the tire of a low ground clearance vehicle to be towed without the plate interfering with the body of the vehicle since it can then slip behind the tire in the area of the wheel well and below the body of the vehicle. In either instance once the bar is so positioned behind the tire, the plate may be turned counterclockwise as viewed in FIG. 3, and lowered until the top leg 51 of the bracket 52 is disposed on the rod 48. Additionally, the plate 44 may be initially disposed in the position illustrated in phantom at the left side of FIG. 3 if the vehicle has sufficient clearance for the plate to enter behind the tire. In this case the plate may be positioned by adjustment of the arm 40 until the plate abuts the tire and as the cradle is lifted by the wheel lift apparatus and the tire drops into the crotch of the cradle, the plate will be pushed rearwardly by the tire until it reaches the upright operative support position. This may be most convenient for the operator since the arms 40 can be adjusted and secured in the receptacle 34 without excessive manipulation of the arm.

When a vehicle to be towed has a tire adjacent a curb or the like, the arm 40 may be removed from the receptacle 34 and positioned so that the bar 42 and the plate in the lowered position may be received behind the tire. The only clearance required for such an operation is that the space between the tire and the curb must be equal to only slightly more than the width of the arm 40, which is approximately two inches. The arm can then be manipulated to position the bar 42 and the plate behind the tire and then the arm is pushed forwardly until the plate engages the rear of the tire, the arm being reinserted into and adjustably secured within the receptacle 34. When the towing vehicle is not used for towing operations, the arm 40 together with the bar and the plate 44 may be removed from the receptacle 34 and stored in the bed of the towing vehicle with a minimum of storage space utilized.

The plate 44 must of course be sufficiently strong and rigid for its function and is formed from steel plate or the like, approximately ¼ inch thick. However, it is anticipated that a strengthening member will widened to the surface 50 of the plate, attached thereto adjacent the ends 58, 62 and bridge the rod 48. However, for purposes of clarity of presentation, such member is not illustrated in the drawing.

Numerous alerations of the structure herein disclosed will suggest themselves to those skilled in the art. However, it is to be understood that the present disclosure is for purposes of illustration only and not to be construed as a limitation of the invention. All such modifications which do not depart from the spirit of the invention are intended to be included within the scope of the appended claims.

What is claimed is:

1. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire of said vehicle, each of said cradles having front support means for supporting a front surface portion of the respective tire and rear support means for supporting a rear surface portion thereof, said support means including an elongated arm and a leg secured to and rigidly extending transversely to the arm, means for mounting said rear support means to a respective end portion of said tow bar such that said leg is spaced from said front support means, a foldable plate carried by said leg and selectively moveable at least between an operative position with an extremity thereof extending substantially upright for engaging the rear surface of the respective tire and a rearwardly extending position having said extremity extending in a direction generally opposed to said front support means, and means for holding said plate in said operative position for providing support to the rear surface of said tire.

2. Apparatus as recited in claim 1, wherein said plate is mounted on a rod carried on a rear surface of said leg.

3. Apparatus as recited in claim 1, wherein said arm is adjustably attached to said mounting means.

4. Apparatus as recited in claim 1, wherein said plate has a bowed cross sectional configuration defining a concave form on one surface of said plate, said one surface facing in the direction toward said front support means when said plate is in said operative position and facing substantially upwardly when said plate is in said rearwardly extending position.

5. Apparatus as recited in claim 4, wherein said plate has a bend in a surface thereof adjacent said extremity for abutting a tire supported in said carriage.

6. Apparatus as recited in claim 1, wherein said plate in said rearwardly extending position is disposed in a downwardly reclined disposition with said extremity disposed on a roadbed to provide a ramp for said tire to be drawn over said plate and into the cradle.

7. Apparatus as recited in claim 1, wherein said plate may be folded to a third position inclined relatively to said upright position with said extremity extending in a forwardly inclined direction, said plate in said third position being adapted to abut said tire and be moved thereby toward said operative position as said cradle and tire are lifted.

8. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire of said vehicle, each of said cradles having front support means for supporting a front surface portion of the respective tire and rear support means for supporting a rear surface portion thereof, said rear support means including an elongated arm and a leg extending transversely to the arm, means for mounting said rear support means to a respective end portion of said tow bar such that said leg is spaced from said front support means, a foldable plate carried by said leg and selectively moveable at least between an operative position with an extremity thereof extending substantially upright for engaging the rear surface of the respective tire and a rearwardly extending position having said extremity extending in a direction generally opposed to said front support means, said plate including bracket means secured to a surface thereof facing oppositely from said front support means when said plate is in said operative position and facing downwardly when said plate is in said rearwardly extending position, said bracket means having en elongated slot, a rod carried on a rear surface of said leg and received with in said slot for mounting said plate, said rod being disposed at one end of said slot when said plate is in said operative position, and means for holding said plate in said operative position for providing support to the rear surface of said tire.

9. Apparatus as recited in claim 8, wherein said bracket means is mounted adjacent an end of said plate remote from said extremity and said plate may engage said tire in the operative position adjacent said extremity, said end being adapted to abut said leg and preclude inadvertent movement of said plate toward said rearwardly extending position when said plate is in said operative position thereby to define said means for holding said plate.

10. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire or said vehicle, each of said cradles having front support means for supporting a front surface portion of the respective tire and rear support means for supporting a rear surface portion thereof, said rear support means including an elongated arm and a leg extending transversely to the arm, means for mounting said rear support means to a respective end portion of said tow bar such that said leg is spaced from said front support means, a foldable plate carried by said leg and selectively moveable at least between an operative position with an extremity thereof extending substantially upright for engaging the rear surface of the respective tire and a rearwardly extending position having said extremity extending in a direction generally opposed to said front support means, wherein said plate is attached to said leg by a sliding hinge means, said sliding hinge means being defined by a rod carried by one of said plate and said leg and a bracket defining a slot for receiving said rod carried by the other of said plate and said leg, said rod being selectively relatively moveable within said slot to position said plate in and out of said operative position, and means for holding said plate in said operative position for providing support to the rear surface of said tire.

11. Apparatus as recited in claim 10, wherein said arm is adjustably attached to said mounting means.

12. Apparatus as recited in claim 10, wherein said plate has a bowed cross sectional configuration defining a concave form on one surface of said plate, said one surface facing in the direction toward said front support means when said plate is in said operative position and facing substantially upwardly when said plate is in said rearwardly extending position.

13. Apparatus as recited in claim 10, wherein said plate has a bend in a surface thereof adjacent said extremity for abutting a tire supported in said carriage.

14. Apparatus as recited in claim 10, wherein said plate in said rearwardly extending position is disposed in a downwardly reclined disposition with said extremity disposed on a roadbed to provide a ramp for said tire to be drawn over said plate and into the cradle.

15. Apparatus as recited in claim 10, wherein said plate may be folded to a third position inclined relatively to said upright position with said extremity extending in a forwardly inclined direction, said plate in said third position being adapted to abut said tire and be moved thereby toward said operative position as said cradle and tire are lifted.

16. Apparatus as recited in claim 10, wherein said rod is carried by said leg on a rear surface thereof and said bracket is secured to said plate.

17. Apparatus as recited in claim 16, wherein said bracket is secured to a surface of said plate facing oppositely from said front support means when said plate is in said operative position and facing downwardly when said plate is in said rearwardly extending position, said rod being disposed at one end of said slot when said plate is in said operative position, said one end being closer to said extremity than the other end of said slot.

18. Apparatus as recited in claim 17, wherein said bracket is mounted adjacent an end of said plate remote from said extremity and said plate may engage said tire in the operative position adjacent said extremity, said end adapted to abut said leg to preclude inadvertent movement of said plate towards said rearwardly extending position when said plate is in said operative position thereby to define said means for holding said plate.

19. Apparatus as recited in claim 18, wherein said plate in said rearwardly extending position is disposed in a downwardly reclined disposition with said extremity disposed on a roadbed to provide a ramp for said tire to be drawn over said plate and into the cradle.

20. Apparatus as recited in claim 18, wherein said plate may be folded to a third position inclined relatively to said upright position with said extremity extending in a forwardly inclined direction, said plate in said third position being adapted to abut said tire and be moved thereby toward said operative position as said cradle and tire are lifted.

* * * * *

UNITED STATES PATENT AND TRADEMARK OFFICE
CERTIFICATE OF CORRECTION

PATENT NO. : 4,904,146

DATED : February 27, 1990

INVENTOR(S) : Walter G. Lock & Vernon S. Moore

It is certified that error appears in the above-identified patent and that said Letters Patent is hereby corrected as shown below:

Column 7, line 47 after the word "said" please insert - - rear --

Signed and Sealed this

Ninth Day of April, 1991

*Attest:*

HARRY F. MANBECK, JR.

*Attesting Officer*  Commissioner of Patents and Trademarks